Patented Aug. 28, 1934

1,971,981

UNITED STATES PATENT OFFICE 1,971,981

FOOD PRODUCT AND PROCESS FOR PRODUCING SAME

Frederick E. Hollweg, Douglaston, N. Y.

No Drawing. Application November 22, 1933,
Serial No. 699,133

4 Claims. (Cl. 99—16)

This invention relates to a food product and to a process of producing the same. The product, according to my invention, combines certain characteristics of a soft cheese such as so-called cottage cheese and certain characteristics of a frozen confection such as ice cream, and the combination of these characteristics, and certain characteristics imparted to the product by the combination of materials utilized and by the process employed, produces a food product having the food value of a comparable cheese, and the stimulus of a new and novel food form, and also produces a superior flavor and quality rendering it most appetizing to persons who have a taste for cheese.

The features of novelty which I believe to be characteristic of my invention are set forth with particularity in the appended claims. My invention itself, however, both as to its fundamental principles and as to its particular embodiments, will best be understood by reference to the specification, in which I have described, by way of example only, and not in limitation, certain ways in which my invention may be practiced.

In accordance with one aspect of my invention, I may utilize fifty (50%) per cent of soft cheese, such as that known to those skilled in the art as "cottage cheese" (coagulated skimmed milk). To this I may add twenty-five (25%) per cent of cream containing about twenty-five to thirty (25 to 30%) per cent butter fat, depending on the richness of the product desired, and preferably about twenty-five (25%) per cent buttermilk (so-called Bulgarian, acidophilus or other fermented milk), and a small amount of gelatine, preferably not to exceed one (1%) per cent.

The materials are mixed together at normal room temperature and may be flavored by the addition of a suitable flavoring agent; for example, salt may be added in the proportion of one pound of salt to each five gallons of mix. Pimiento, Roquefort, or other flavoring agents may be added, if desired.

After the mix has been made, it may be placed in a mixer wherein it may be subjected to agitation and low temperature sufficient to produce freezing. An ordinary ice-cream freezer of the type found in dairies which manufacture ice-cream, serves very well for the purpose.

The mixture is preferably placed in the freezer at room temperature, and the freezer operated for a short period, say, five minutes, without cooling, or at least without cooling the mix to freezing temperature. The agitation of the mix in the freezer prior to freezing is of advantage in that it helps to produce a smooth, appetizing product in amorphous, creamy form, breaking up the lumps of cheese.

After the freezer has been operated for a short period, say about five minutes, without cooling, the temperature is lowered to produce freezing (freezing cold brine is permitted to circulate through the freezer) and the operation is continued until freezing, or at least partial freezing, has occurred. I prefer to continue the freezing until about seventy (70%) per cent over-run or swell has resulted; that is to say, until the volume of the mix has increased about seventy (70%) per cent, but the time of the run may be controlled to produce a greater or less over-run.

The agitation and freezing in the container may then be stopped, and the product run into brick pans, and then stored in the hardening room and subjected to a lower temperature for some hours. It may then be cut into blocks, or otherwise suitably prepared, and may be handled, wrapped, packed and stored, in a manner similar to chocolate coated ice-cream, such as that known as "Eskimo Pie" and the like, or wrapped like cheeses in tinfoil.

In case the mixture melts, it may be refrozen in the packages, but not more than once or twice, such melting and refreezing without agitation having a tendency to produce free ice crystals in an amount which renders the product undesirable.

When eaten in the frozen state, the product has certain of the taste characteristics of the cheese components entering into it and the lactic acid taste of buttermilk, and certain of the cold sensations of ice-cream, but is much lighter and fluffier than the comparable unfrozen cheese and melts in the mouth, and its taste and flavor is somewhat more delicate, due, probably, to its lesser specific gravity than that of an unfrozen mix, because of the expansion taking place in the freezing process, and contains substantially no free ice crystals.

It will be noted that I use no sugar or sweetening in the process of preparing my product, which has heretofore been an essential ingredient of all frozen foods intended to be eaten in the frozen state, such as ice-cream, frozen custard, sherbet, ices, and the like.

While I have described certain preferred embodiments of my invention and have set forth certain proportions of ingredients, and particular methods of carrying out the process of my invention, it will be understood that these are by way of example only, and not in limitation, and that the ingredients used in the mix may be varied in kind, and in proportion, and the amount of overrun, and temperature may be varied as may be found to yield the particular taste and/or consistency desired, in any particular case.

I declare that what I claim and desire to secure by Letters Patent is:

1. A process for producing a frozen product having a predominating cheese taste, consisting in providing a mix including cottage cheese, a constituent rich in butter fat to permit freezing, smoothness and richness of the product, and a fermented milk of sufficient lactic acid to maintain the lactic acid content of the product, and freezing the mix.

2. The process of producing a mix adapted to be frozen into a smooth product having a predominating cheese taste, consisting in mixing cottage cheese, a cream rich in butter fat and a fermented milk, the proportion of the cottage cheese substantially equalling the proportions of both of the other ingredients in the product.

3. A smooth frozen product having a predominating cheese taste made up of cottage cheese, cream rich in butter fat and fermented milk of sufficient lactic acid to maintain the lactic acid content of the product.

4. A smooth frozen product having a predominating cheese taste including cottage cheese, cream rich in butter fat and fermented milk of sufficient lactic acid to maintain the lactic acid content of the product, the proportion of the cottage cheese substantially equalling the proportions of the other ingredients.

FREDERICK E. HOLLWEG.